United States Patent [19]

Bosten et al.

[11] Patent Number: 4,858,662
[45] Date of Patent: Aug. 22, 1989

[54] PLATE JOINER HAVING A SUPERIOR MITER GUIDE FOR MITERED CARCASE JOINTS

[75] Inventors: Donald R. Bosten, Jackson; Randy G. Cooper, Milan, both of Tenn.

[73] Assignee: Porter-Cable Corporation, Jackson, Tenn.

[21] Appl. No.: 202,052

[22] Filed: Jun. 3, 1988

[51] Int. Cl.$^4$ .......................... B27M 1/00; B23C 1/20
[52] U.S. Cl. ........................... 144/136 C; 144/134 D; 144/371; 409/178; 409/182
[58] Field of Search ........... 144/136 R, 136 C, 134 R, 144/134 D, 371; 409/182

[56] References Cited

U.S. PATENT DOCUMENTS

| | | |
|---|---|---|
| 1,687,207 | 1/1928 | Hawker . |
| 1,981,183 | 11/1934 | Margellis . |
| 2,378,713 | 6/1945 | Lawton . |
| 2,610,658 | 9/1952 | Koeling . |
| 3,282,308 | 11/1966 | Sprague . |
| 3,812,584 | 5/1974 | Peter . |
| 4,434,586 | 3/1984 | Müller et al. . |
| 4,545,121 | 10/1985 | Armbruster et al. . |
| 4,615,654 | 10/1986 | Shaw ................................. 409/182 |

FOREIGN PATENT DOCUMENTS

| | | |
|---|---|---|
| 337653 | 5/1959 | Fed. Rep. of Germany . |
| 339735 | 8/1959 | Fed. Rep. of Germany . |
| 2838233 | 6/1979 | Fed. Rep. of Germany . |

OTHER PUBLICATIONS

*Furniture Design and Manufacturing,* Mar. 1984, p. 16, by Glen D. Fugishy, Ph.D., "Wood Technology-Plate Joining System".
*Northern Woods* (Newsletter), Issue No. 12, Spring Quarter, 1988, Page 1, Entitled "Plate Joinery", by Annette Weir.
*Workbench,* Apr. 1988, Page 1, "The Workbench Guide to Plate Joiners", by Lawrence Okrend.
*Popular Woodworking,* Jun./Jul. 1987, p. 23, Entitled "Is There a Plate Joiner in Your Future?", Hugh Foster.
*Wood Magazine,* Jun. 1988, p. 44, Jim Barrett, Entitled "Make Strong Accurate Joints in Seconds with Plate Joiners".
Porter-Cable Corporation Promotional Literature Published Jun. 16, 1987.
Lamello-Minilo Brochure, date unknown, entitled "Hardly Believable, It's So Easy, and the Job is Finished So Quickly".
Elu Brochure, date unknown, entitled "Another First From Elu 'Biscuit' Jointer and Groover DS140".
Virutex Brochure, date unknown, entitled "Ensambladora 0-87".
Lamello Brochure, Date Unknown, Entitled "Nutfrasmaschine mit Schwenkbarem Anschlag fur TDP-Vërbindungen. . . damit die Arbeit Spass macht".
Lamello 2000 (Steiner Lamello SA) brochure, date unknown, entitled "Universal Circular Saw and Grooving Machine; Lamello Automate Wood Joining for Mass Production".
Lamello Top Brochure, date unknown, entitled "Groove Cutting Machine with Swivelling Stop for Top Connections . . . That Makes Work a Pleasure".
Minilo Top Brochure, date unknown, entitled "For Top Joints . . . That Make Work a Pleasure".

Primary Examiner—W. Donald Bray
Attorney, Agent, or Firm—Merchant, Gould, Smith, Edell, Welter & Schmidt

[57] ABSTRACT

Disclosed is a plate joiner having a superior miter guide for mitered carcase joints. The plate joiner comprises a system for forming a plunge cut. The joiner also includes a miter guide for securely engaging the mitered portion of carcase workpieces and for accurately and reliably locating plunge cuts perpendicularly into opposing mitered carcase joint surfaces so that, when a joint is glued together with a plate in opposing plunge cuts, a closed joint having mitered outside workpiece surfaces is formed, independent of workpiece thickness.

15 Claims, 3 Drawing Sheets

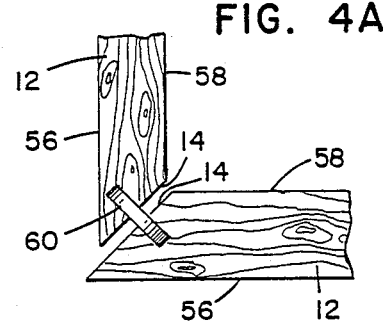
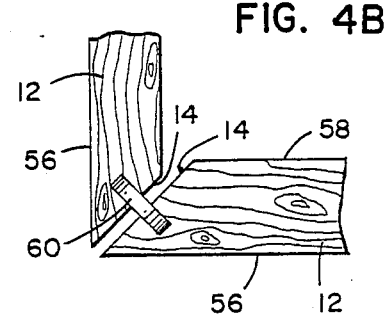
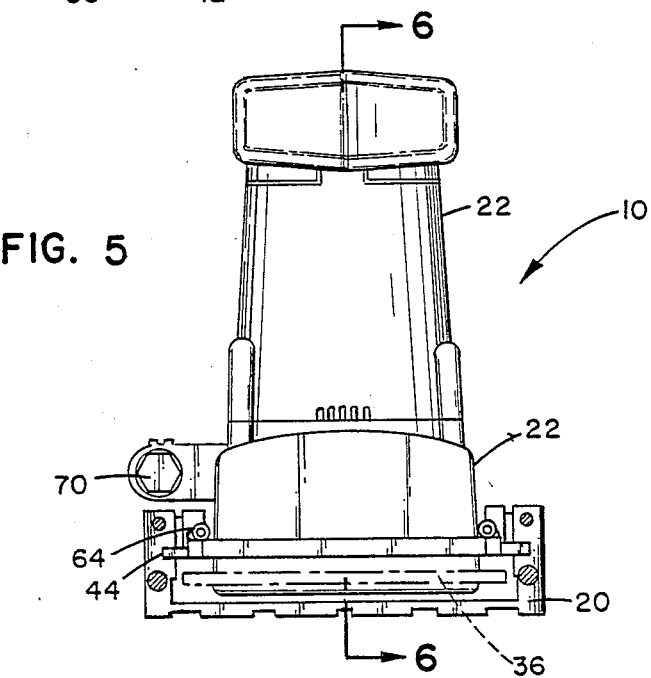
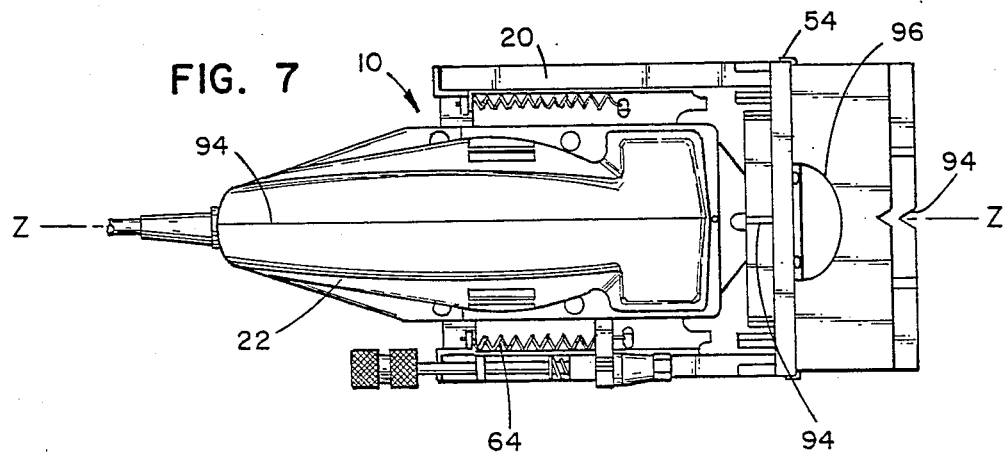

PLATE JOINER HAVING A SUPERIOR MITER GUIDE FOR MITERED CARCASE JOINTS

FIELD OF THE INVENTION

The present invention relates generally to the field of woodworking and more specifically to a device used in plate joinery which provides precision alignment for plunge cuts into joint surfaces.

BACKGROUND OF THE INVENTION

Plate joinery permits accurate and secure attachment of workpieces connected at a joint. Typical plate joinery requires a device for making a plunge cut or kerf in a joint surface designed for receipt of a plate (also called a biscuit, wafer, or spline) of wood or other material. Oppositely disposed grooves are cut into each piece of wood to be joined. Then glue and a plate is placed within each groove, and the plates are allowed to expand from application of the glue. The expansion of the glued biscuit in the opposing cuts provides an accurate, strong woodworking joint. Accordingly, plate joinery provides a strong, simple, and relatively long lasting joint for use in the field of woodworking.

Known plate joiner devices are generally comprised of a housing, a motor unit and a rotating blade section. A portion of the housing contacts a joint surface and the rotating blade section is then operably moved toward and engages a portion of the joint surface at the location of the desired cut. The rotating blade then cuts into the joint surface and is retracted. A particular advantage of plate joinery over other joint forming methods is the ease of use, aesthetic result, and overall efficiency.

However, proper plate joinery requires precision cuts of predetermined angle and location in the corresponding workpieces. Improper placement and angle orientation of a blade section of a plate joiner device with respect to a workpiece surface may result in misalignment between joint surfaces and outer surfaces in opposing workpieces. Such misalignment is a problem which is most prevalent when connecting mitered carcase joints with plunge cut locations measured from an inner workpiece surface, rather than an outer workpiece surface. Although prior art plate joiners may be capable of referencing the location of a plunge cut into a mitered carcase joint surface from an outside workpiece surface, no prior art devices provide means for securely engaging the mitered portion of carcase workpieces or for referencing from the outside workpiece surface the angle of the plunge cut with respect to the joint surface. This is important because proper orientation of plunge cuts in carcase mitered joint surfaces determines alignment quality of the joint surfaces.

What has been needed, therefore, has been a plate joiner having miter guide means for securely engaging the mitered portion of carcase workpieces and for accurately and reliably locating plunge cuts perpendicularly into opposing mitered carcase joint surfaces so that, when a joint is glued together with a plate in opposing plunge cuts, a closed joint having matching outside carcase surfaces is formed, independent of workpiece thickness.

SUMMARY OF THE INVENTION

The present invention is a plate joiner having a superior miter guide for mitered carcase joints. The joiner comprises plunge cutting means for forming a plunge cut and miter guide means for securely engaging the mitered portion of carcase workpieces and for accurately and reliably locating plunge cuts perpendicularly into opposing miter carcase joint surfaces so that, when a joint is glued together with a plate in opposing plunge cuts, a closed joint having matching outside workpiece surfaces is formed, independent of workpiece thickness.

BRIEF DESCRIPTION OF THE DRAWINGS

FIG. 4A illustrates a representative and partially opened miter carcase joint formed by prior art plate joiner devices in which the outer surfaces are misaligned due to referencing the location of the cuts from inside workpiece surfaces and due to different thicknesses of the joined workpieces.

FIG. 4B illustrates a representative and partially opened miter carcase joint formed using a plate joiner device of the present invention in which the workpiece outer surfaces are precisely aligned independent of the different thicknesses of the joined workpieces.

FIG. 5 is a front elevation view of a preferred embodiment plate joiner device having the preferred miter guide means and the guide surface removed.

FIG. 7 is a top plan view depicting a preferred embodiment plate joiner device having alignment means and viewing means illustrated.

DETAILED DESCRIPTION OF THE PREFERRED EMBODIMENTS

Detailed preferred embodiments of the present invention are disclosed. It is to be understood, however, that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. It will be understood that in some circumstances relative material thicknesses and relative component sizes may be shown exaggerated to facilitate an understanding of the invention.

Figure 1:
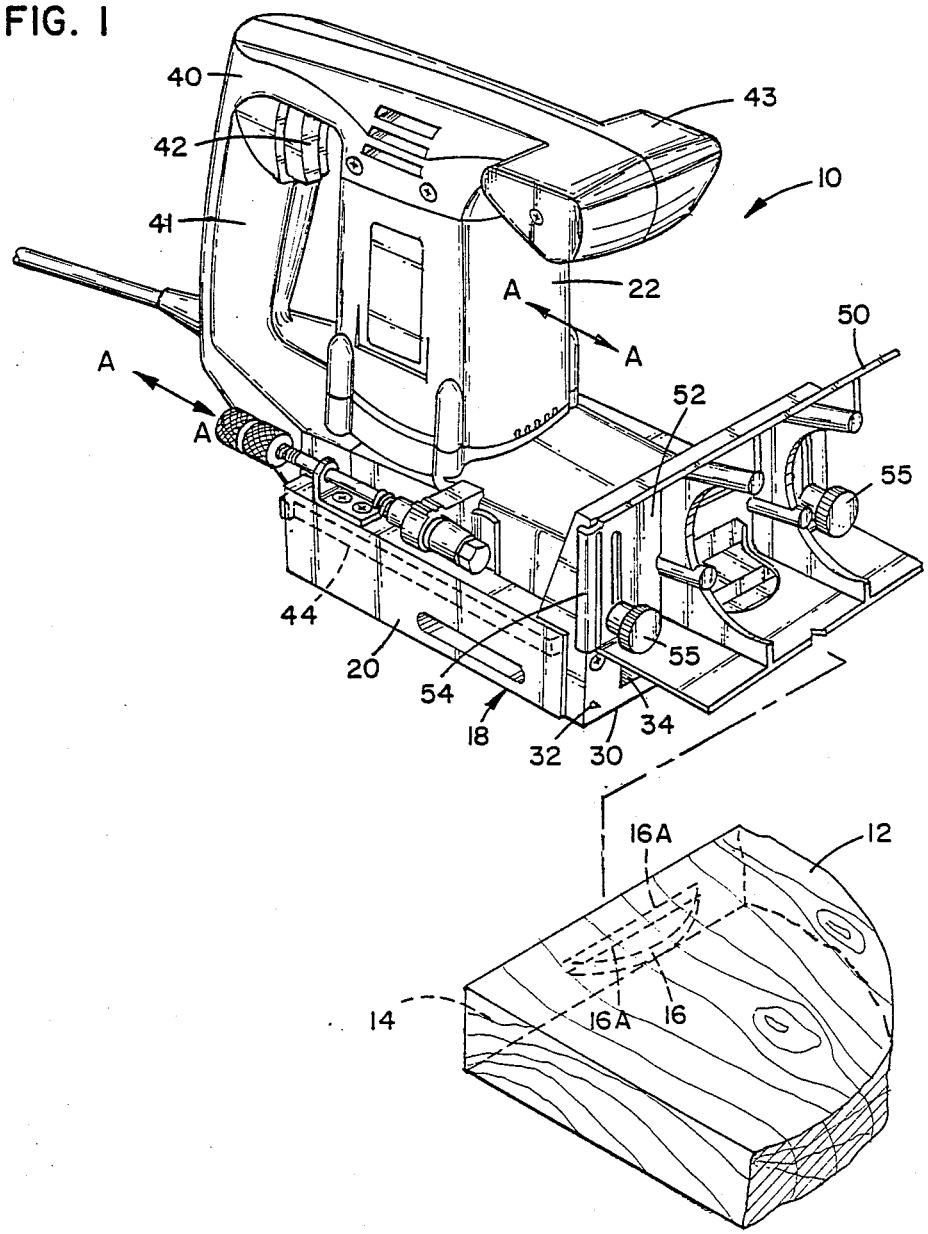
FIG. 1 is a perspective view of a plate joiner showing removable miter guide means attached to the housing section and illustrating the shape of cut which the device imparts to a workpiece.

Referring to FIG. 1, a plate joiner device 10 is illustrated. Plate joiner device 10 is shown in association with a workpiece 12 having a surface 14 which will form a surface of a joint between two workpieces 12. Plate joiner device 10 is constructed and arranged to make a plunge cut 16 in surface 14 of workpiece 12.

A plate joiner device 10 preferably comprises a base 20 on which is movably mounted a housing section 22. As will be further detailed below, housing section 22 protects and substantially surrounds a motor section 24 and a blade section 26, both sections being shown in more detail in FIG. 6. A guide surface 30 is located at the forward end of base 20. Guide surface 30 is designed for placement against a workpiece joint surface such as 14. Guide surface 30 preferably includes anchor means 32 for engaging joint surface 14 and for preventing lateral slippage of plate joiner device 10 at initiation of, and during, wood cutting operations. Slot 34 is located in guide surface 30 to permit movement therethrough of a cutter 36, shown in FIG. 2, which then engages and cuts joint surface 14. Referring again to FIG. 1, a handle grip portion 40 is preferably located at the rear of device 10 substantially opposite guide surface 30. Preferably, handle means 40 is generally vertically oriented. Handle means 40 may also conveniently include trigger switch means 42 for controlling the electrical operation of plate joiner device 10.

Housing section 22 comprising handle 40 is preferably slidably mounted in track means 44 on base 20. Preferably housing section 22 is a precision machined housing which operates with virtually no lateral motion when mounted in track 44. This enhances the accuracy of cuts being made in various workpieces 12. Further, movement of housing section 22 toward and away from workpiece 12 in the direction of lines A—A, FIG. 1, is then preferably accomplished by simple push-pull movement imparted to handle means 40.

Figure 2:
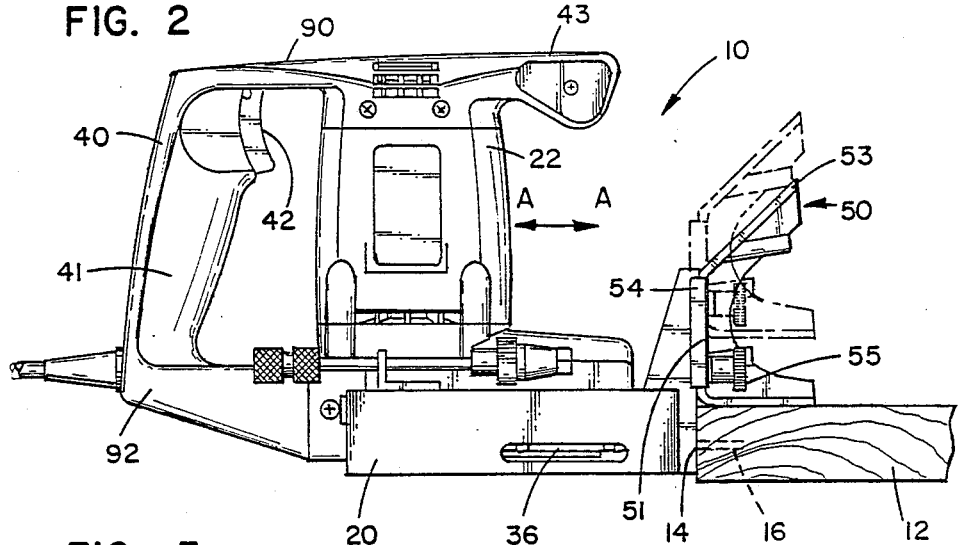
FIG. 2 is a side elevation view of a preferred embodiment plate joiner device with a rear vertically-oriented handle grip and a forward-located removably attached miter guide means shown positioned above a 90 degree angle joint surface on a workpiece.
Figure 3:
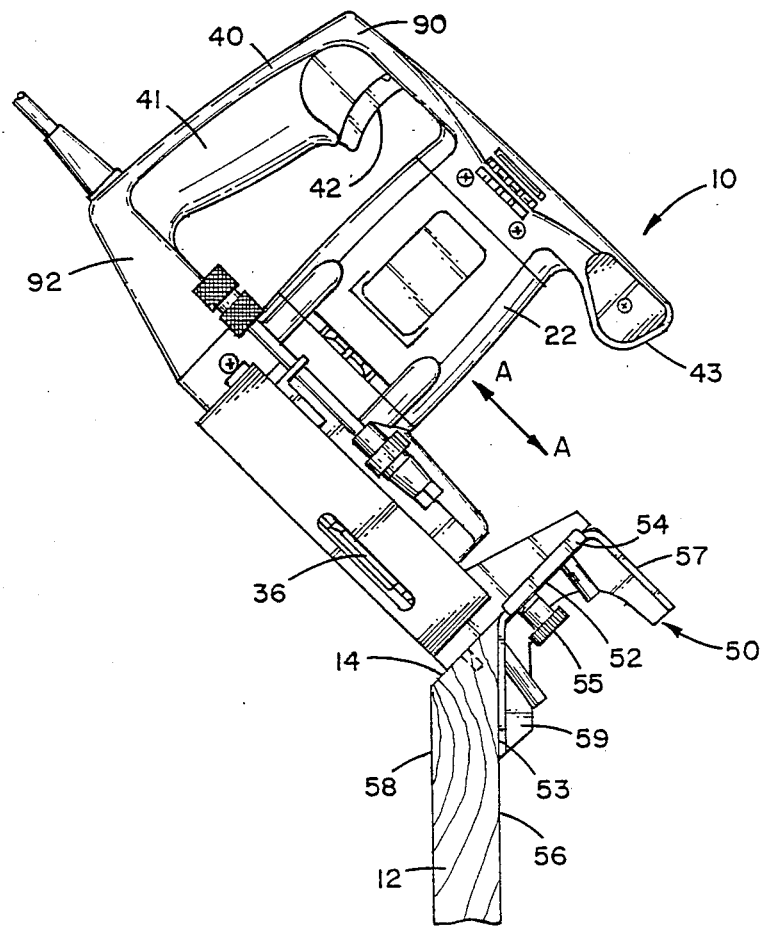
FIG. 3 is a side elevation view of a preferred embodiment plate joiner device depicting the relationship between a preferred miter guide means, a mitered carcase joint surface of a workpiece, and an outside workpiece surface.

Miter guide means 50 is preferably adjustably attached to guide surface 30. As will be further detailed, miter guide means 50 comprises improved means for orienting and guiding precision plunge cuts perpendicularly into joint surfaces shaped as carcase mitered joints, for example, at mitered angles of 45 degrees, as illustrated in FIG. 3. Device 10 may also be used on joint surfaces having 90° angles as shown in FIGS. 1 and 2. Positioning means 51 is provided to facilitate the positioning of miter guide means 50 on guide surface 30 and for maintaining miter guide means 50 in proper horizontal alignment. Flanges 54 are preferably provided to facilitate attachment of miter guide means 50 onto guide surface 30 and to provide horizontal stability to ensure proper horizontal alignment of miter guide means 50 relative to workpiece 12 and cutter 36. Horizontal stabilizers or flanges 54 preferably extend from miter guide plate projection 52 along opposing side portions of guide surface 30. In the preferred embodiment, flanges 54 slidably engage outside surfaces of base 20 for permitting adjustment of the plunge cut distance from the outside surface of a workpiece while maintaining parallelism between the outside surface of the workpiece and plunge cut longitudinal edges 16A on a joint surface 14.

FIG. 2 is a side elevation view of a preferred embodiment plate joiner device shown abutting a 90 degree joint surface 14 of workpiece 12. As previously indicated, miter guide means 50 may be preferably adjusted vertically on guide surface 30 to accommodate workpieces 12 having various thicknesses. As illustrated in FIG. 2, plate joiner device 10 has made a plunge cut 16 into workpiece 12 using cutter 36, which is shown in a position retracted from workpieces 12. Miter guide means 50 is preferably adjustably attached to guide surface 30 by attaching means 55. Preferably, attaching means 55 comprises threaded fasteners or similar means for tightening or releasing miter guide means 50 onto guide surface 30. Further, a plurality of attaching means 55 may be provided.

FIG. 3 is an environmental illustration depicting a side elevation view of a preferred embodiment plate joiner device 10 in contact with a joint surface 14 of wood plate 12, the joint surface 14 being angled in the shape of a mitered joint. As shown in FIG. 3, miter guide means 50 has been re-positioned, in comparison to FIG. 2, for contact of miter guide plate 53 with outer surface 56 of workpiece 12. In the preferred embodiment, re-positioning of miter guide means 50 is readily accomplished with the aid of flanges 54 and attaching means 55. Miter guide plate 53 is oriented at a predetermined angle to guide surface 30, which preferably includes an angle of 45° to guide surface 30.

It is to be appreciated that of the many joints which may be formed using plate joiner devices, the mitered carcase joint is often the most difficult to precisely join. A cause of this difficulty is due to the varied thicknesses of otherwise precisely matched workpieces 12. For example, as illustrated in FIG. 4, differences in the thicknesses of workpieces 12 which are to be joined at joint surfaces 14 may show up as misalignment of outer surfaces 56, thus presenting a poor appearance. The misalignment occurs principally due to plate joiners which have guide means that contact and align from the back or inner surface 58 of workpieces 12 being joined. As a result, the location of the cut is spaced from the inner surfaces 58 rather than the outer surfaces 56, causing differences in workpiece thickness to become apparent from the misaligned outer surfaces 56. Such an outcome is undesirable and results in wasted effort and resources. Further difficulties arise when a plunge cut location is referenced from an outer surface without also securely engaging the mitered portion of the carcase workpiece or without orienting the plunge cut angle from the outside surface so that the plunge cuts are accurately and reliably made perpendicularly to the joint surface.

However, as shown in FIG. 3, plate joiner device 10 of the present invention provides miter guide means 50 which overcomes the misalignment problem of other devices while also providing proper angular orientation for the plunge cuts. Miter guide means 50 permits percision plunge cuts which are measured and oriented from outer surface 56. This is achieved by positioning outer surface 56 against miter guide plate 53 and by positioning joint surface 14 against guide surface 30. Consequently, cutter 36 imparts a precision plunge cut 16 into joint surface 14 independent of the thickness of either of workpieces 12 which are to be joined and at an angular orientation which is perpendicular to joint surfaces 14; in the preferred embodiment, this is accomplished by securely engaging the mitered portion of the carcase workpiece through contact of miter guide means with both the mitered joint surface and the outside surface of the workpiece and by referencing the angle of the plunge cut from outer surface 56 of workpiece 12. Therefore, mitered carcase joints may be formed using preferred plate joiner device 10 which insures that the joint surfaces 14 and the outside surfaces 56 will be properly aligned even when using workpieces 12 of different thicknesses, as illustrated in FIG. 4A. As illustrated in FIG. 3, preferred plate joiner 10 with miter guide means 50 securely engages the mitered portion of carcase workpiece 12, holds workpiece 12 firmly in place, and allows for improved accuracy of the plunge cut 16 in joint surface 14. Also, precision is enhanced by structural support means 59 located on miter guide means 50. Structural support means 59 aids in maintaining the predetermined angle of miter guide plate 53 and perpendicular guide plate 57.

After plunge cuts 16 are made in joint surfaces 14, connecting means 60 is inserted with glue in opposing portions of the plunge cuts. Connecting means 60 is preferably a pressed wood biscuit or wafer of generally arcuate shape.

FIG. 5 is a front elevation view of preferred plate joiner device 10 with guide surface 30 and miter guide means 50 removed. FIG. 5 illustrates a preferred relationship of base 20 with slidably mounted housing section 22. Preferably, spring means 64, further illustrated in FIG. 7, maintains cutter 36 away from contact with workpiece 12 when device 10 is not in use. However, the force of spring means 64 may be readily overcome by a user preferably holding handle means 40 and pushing forward, making housing section 22 slide in track means 44 toward workpiece 12. Calibration means 70 is also illustrated. Calibration means 70 preferably provides means for calibrating and adjusting the depth of penetration of cutter 36 into wood plate 12.

Figure 6:
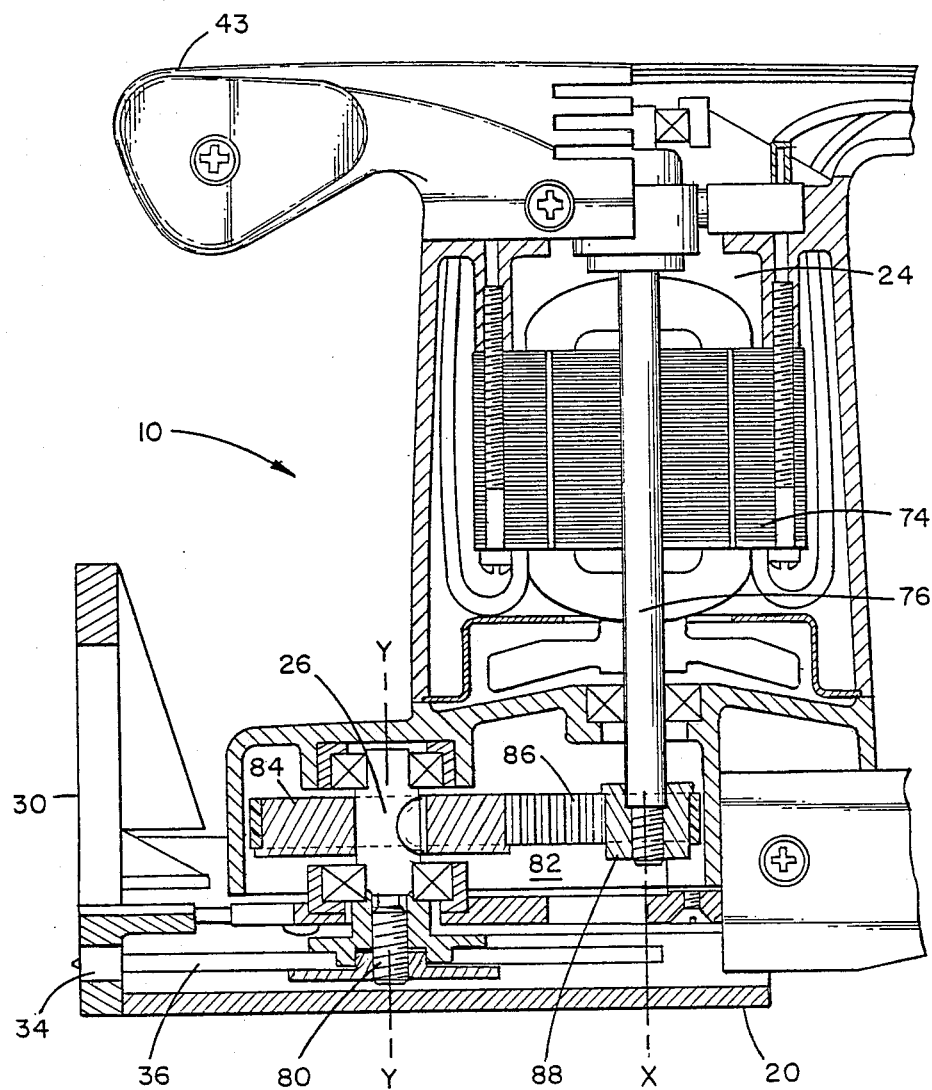
FIG. 6 is a fragmentary side cross-sectional view taken generally along line 6—6, FIG. 5, illustrating a motor section output shaft in parallel relationship with a blade section drive shaft and with the respective shafts connected by pulley and belt means.

FIG. 6 illustrates a fragmentary side cross-section view taken generally along lines 6—6 of FIG. 5. FIG. 6 illustrates motor section 24 and blade section 26. More specifically, motor section 24 comprises a motor 74 having an output shaft 76. A 5 amp or similar motor may be employed. Further, output shaft 76 of motor 74 has an axis X which is preferably oriented substantially parallel to guide surface 30 and substantially perpendicular to cutter slot 34. Also, blade section 26 preferably comprises a drive shaft 80 which is connected with cutter 36. Preferably, drive shaft 80 has an axis Y oriented substantially parallel to guide surface 30 and substantially perpendicular to cutter slot 34. Cutter 36 may comprise a six tooth, carbide-tipped cutter blade, or other plate joiner cutter blades may be used. Spacing may be provided between drive shaft 80 and output shaft 76 for achieving desired power ratios or for allowing setback of vertically oriented housing 22 from the first end portion 18 of device 10. Alternately, drive shaft 80 may be spaced relative to guide surface 30. This spacing allows improved maneuverability of device 10 relative to obstacles located above workpiece 12 which would otherwise prevent access of device 10 due to upright motor section 24.

Quiet drive means 82 is provided to rotate cutter 36 without the use of interlocking gears between drive shaft 80 and output shaft 76. Preferably, quiet drive means 82 comprises drive shaft pulley means 84 located on drive shaft 80. Drive shaft pulley means 84 is constructed and arranged to accept belt drive means 86 which powers drive shaft 80. Output shaft pulley means 88 is preferably located on output shaft 76. Output shaft pulley means 88 is constructed and arranged to accept belt drive means 86 to provide power from output shaft 76 to drive shaft 80. Therefore, belt drive means 86 permits coupling of drive shaft pulley means 84 and output shaft pulley means 88 so that motor 74 drives cutter 36 without the intense noise or heat of interlocking gears. Indeed, quiet drive means 82 of preferred plate joiner device 10 operates at a decibel level substantially lower than that of plate joiner devices which utilize other drive means, such as interlocking gear drives or similar mechanisms. Accordingly, quiet drive means 82 allows more preferable environmental conditions when operating plate joiner device 10. Belt drive means 82 is preferably a Goodyear brand belt drive of the SUPER TORQUE PD trademark variety, although other combinations of belt drive means and motor are possible while achieving the advantages of this embodiment.

Referring to FIGS. 1, 2, 3, and 7, it has been recognized by those skilled in the art that primary handle means 40 provides superior ergonomic means for moving housing section 22, and therefore cutter 36, toward and away from workpiece 12, while also allowing the fingers of one using device 10 to remain free of the sliding base mechanism and, therefore, safe from pinching due to that sliding action. Moreover, the orientation of handle means 40 relative to base 20 and guide surface 30 provides means for conveniently positioning and safely holding guide surface 30 of base 20 at a predetermined point on joint surface 14. These advantages are optimally achieved by aligning handle means 40 along the central axis of plate joiner device 10, as illustrated by line Z—Z in FIG. 7. Also, handle means 40 preferably includes a generally vertically oriented axis. This superior orientation of handle means 40 is preferably further enhanced by having an upper portion 90 conveniently located slightly forward of a lower portion 92, thus providing a forward rake, and by having trigger switch means 42 located on handle means 40 for on/off electrical control of device 10. Preferably, trigger switch 42 is spring loaded to provide further ease and safety of operation.

The combination of miter guide means 50, handle means 40, and trigger switch means 42, provides means for maintaining the user's hands at a distance substantially away from cutter 36 during operation. Moreover, alignment means 94 preferably located on base 20, and on the top of housing section 22, and on a forward portion of miter guide means 50 is useful for properly aligning cutter 36 with a predetermined point to be cut on joint surface 14. Alignment means 94 may comprise notches, grooves, etchings, lines, and other focusing means. Additionally, viewing means 96 is preferably provided which permits operable viewing of the position of cutter 36 when cutter 36 protrudes from base 20 through cutter slot 34. Viewing means 96 also preferably permits viewing of joint surface 14 when cutter 36 is retracted within base 20.

Accordingly, miter guide means 50 provides for precision placement of plunge cuts 16 in a mitered carcase joint surface 14 independent of workpiece 12 thickness while also providing accurate angular orientation for plunge cuts 16 referenced from outer surface 56 of workpiece 12. Further, the superior orientation of handle means 40 provides substantial advantages and accommodates the natural push/pull action of plate joining. Yet another advantage of preferred plate joiner device 10 includes quiet drive means 82 which allows operation of device 10 at a decibel level and heat generation level which are substantially less than levels made by other plate joiner devices having different drive systems. Quite drive means 82 also contributes to longer operating lives of devices such as device 10, as well as permitting savings in manufacturing costs.

It is to be understood that while certain embodiments of the present invention have been illustrated and described, the invention is not to be limited to the specific forms or arrangements of parts described and shown above, since others skilled in the art may devise other embodiments still within the limits of the claims.

What is claimed is:

1. A plate joiner having a superior miter guide for mitered carcase joints, comprising:
   (a) a base having a first end portion comprising a guide surface with a cutter slot;
   (b) a cutter normally housed in the base;
   (c) handle means located at a second end portion of the base substantially opposite the first end portion for orienting the guide surface to the joint surface of the workpiece, and for causing the cutter to protrude from the base through the cutter slot and to make a plunge cut into a joint surface of a workpiece when the guide surface of the base is pressed against the joint surface; and
   (d) miter guide means adjustably attached to the guide surface for locating a plunge cut into a mitered carcase joint surface at a predetermined distance from an outside surface of the workpiece independent of workpiece thickness, the miter guide means comprising a miter guide plate having a surface for contacting the outside surface of the workpiece, and for referencing the angle of the plunge cut from the outside surface of the workpiece, the miter guide plate being oriented at a predetermined angle to the guide surface and a projection of the miter guide plate intersecting the guide surface along a line substantially parallel to the cutter.

2. The plate joiner of claim 1 wherein the miter guide plate is oriented at substantially 45 degrees to the guide surface.

3. The plate joiner of claim 1 wherein the miter guide means comprises adjustment means having flanges which slidably engage outside surfaces of the base for permitting adjustment of the plunge cut distance from the outside surface of the workpiece while maintaining parallelism between the outside surface of the workpiece and the plunge cut longitudinal edges on the joint surface.

4. The plate joiner of claim 1 wherein the miter guide means further comprises a perpendicular guide plate oriented at substantially 90 degrees to the guide surface, a projection of the perpendicular guide plate intersecting the guide surface along a line substantially parallel to the cutter.

5. The plate joiner of claim 1 wherein the miter guide means further comprises structural means for maintaining the predetermined angle of the miter guide plate.

6. The plate joiner of claim 1 wherein the miter guide means comprises alignment indication means for aligning the cutter with a predetermined location on a workpiece surface.

7. The plate joiner of claim 1 wherein the base comprises alignment indication means located proximate the guide surface.

8. A plate joiner having a superior miter guide for mitered carcase joints, comprising:
   (a) a base having a first end portion comprising a guide surface with a cutter slot;
   (b) a cutter normally housed in the base;
   (c) handle means located at a second end portion of the base substantially opposite the first end portion for orienting the guide surface to the joint surface of the workpiece, and for causing the cutter to protrude from the base through the cutter slot and to make a plunge cut into the joint surface of the workpiece when the guide surface of the base is pressed against the joint surface; and
   (d) miter guide means comprising a miter guide plate having a surface for contacting an outside surface of the workpiece, the miter guide plate being oriented at a predetermined angle to the guide surface, and adjustably attached to the guide surface for securely engaging the mitered portion of carcase workpieces and for accurately and reliably locating plunge cuts perpendicularly into opposing mitered carcase joint surfaces so that, when a joint is glued together with a plate in opposing plunge cuts, a closed joint having matching outside workpiece surfaces is formed, independent of workpiece thickness.

9. The plate joiner of claim 8 wherein a projection of the miter guide plate intersects the guide surface along a line substantially parallel to the cutter.

10. The plate joiner of claim 8 wherein the miter guide plate is oriented at substantially 45 degrees to the guide surface.

11. The plate joiner of claim 8 wherein the miter guide means comprises flanges which slidably engage outside surfaces of the base for permitting adjustment of the plunge cut distance from the outside surface of the workpiece while maintaining parallelism between the outside surface of the workpiece and the plunge cut longitudinal edges on the joint surface.

12. The plate joiner of claim 9 wherein the miter guide means further comprises a perpendicular guide plate oriented at substantially 90 degrees to the guide surface, a projection of the perpendicular guide plate intersecting the guide surface along a line substantially parallel to the cutter.

13. A plate joiner having a superior miter guide for mitered carcase joints comprising:
   (a) a base having a first end portion comprising a guide surface with a cutter slot;
   (b) a cutter normally housed in the base;
   (c) handle means located at a second end portion of the base substantially opposite the first end portion for orienting the guide surface to the joint surface of the workpiece, and for causing the cutter to protrude from the base through the cutter slot and to make a plunge cut into a joint surface of a workpiece when the guide surface of the base is pressed against the joint surface; and
   (d) miter guide means for securely engaging the mitered portion of carcase workpieces and for accurately forming a plunge cut in the mitered joint surfaces so that the workpieces when joined with a plate in opposing plunge cuts form a carcase assembly with a precisely aligned joint at the joint surface interface and at the outside surfaces of the carcase assembly, the miter guide means comprising:
      (i) a miter guide plate having a surface for contacting the outside surface of the workpieces, the miter guide plate being oriented at substantially 45 degrees to the guide surface, a projection of the miter guide plate intersecting the guide surface along a line substantially parallel to the cutter, and
      (ii) a perpendicular guide plate oriented at substantially 90 degrees to the guide surface, a projection of the perpendicular guide plate intersecting the guide surface along a line substantially parallel to the cutter.

14. The plate joiner of claim 13 wherein the miter guide plate is oriented at substantially 45 degrees to the guide surface.

15. The plate joiner of claim 13 wherein the miter guide means comprises adjustment means having flanges which slidably engage outside surfaces of the base for permitting adjustment of the plunge cut distance from the outside surface of the workpieces while maintaining parallelism between the outside surface of the workpieces and the plunge cut longitudinal edges as on the joint surfaces.

* * * * *